US008331650B2

(12) United States Patent
Yuan et al.

(10) Patent No.: US 8,331,650 B2
(45) Date of Patent: Dec. 11, 2012

(54) METHODS, SYSTEMS AND APPARATUS FOR DEFECT DETECTION

(75) Inventors: Chang Yuan, Vancouver, WA (US); Masakazu Yanase, Vancouver, WA (US); Xinyu Xu, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 315 days.

(21) Appl. No.: 12/846,748

(22) Filed: Jul. 29, 2010

(65) Prior Publication Data

US 2012/0027288 A1   Feb. 2, 2012

(51) Int. Cl.
*G06K 9/00* (2006.01)

(52) U.S. Cl. .......................... 382/149; 382/144; 382/152

(58) Field of Classification Search ................... 382/144, 382/149, 152; 348/88, 95, 125, 131; 356/237.1, 356/237.2; 209/558, 564; 280/735; 701/36, 701/31.6; 702/39; 716/52; 977/839, 887
See application file for complete search history.

(56) References Cited

U.S. PATENT DOCUMENTS

| | | | |
|---|---|---|---|
| 4,811,409 A * | 3/1989 | Cavan | 382/144 |
| 6,266,437 B1 * | 7/2001 | Eichel et al. | 382/149 |
| 6,356,300 B1 | 3/2002 | Shiba | |
| 6,456,899 B1 | 9/2002 | Gleason et al. | |
| 6,578,188 B1 * | 6/2003 | Pang et al. | 716/52 |
| 6,753,965 B2 * | 6/2004 | Kumar et al. | 356/431 |
| 6,882,896 B2 | 4/2005 | Ting et al. | |
| 6,922,482 B1 | 7/2005 | Ben-Porath | |
| 6,987,873 B1 | 1/2006 | Ben-Porath et al. | |
| 7,003,146 B2 | 2/2006 | Eck et al. | |
| 7,003,755 B2 * | 2/2006 | Pang et al. | 716/52 |
| 7,132,652 B1 | 11/2006 | Testoni | |
| 7,196,785 B2 | 3/2007 | Nishiyama et al. | |
| 7,330,581 B2 | 2/2008 | Ishikawa | |
| 7,425,704 B2 | 9/2008 | Miyai et al. | |
| 7,508,973 B2 | 3/2009 | Okabe et al. | |
| 7,538,750 B2 | 5/2009 | Kim et al. | |
| 7,583,832 B2 | 9/2009 | Okuda et al. | |
| 2001/0020194 A1 | 9/2001 | Takagi et al. | |
| 2006/0226865 A1 | 10/2006 | Gallarda et al. | |
| 2008/0004742 A1 | 1/2008 | Hirai et al. | |
| 2009/0136117 A1 | 5/2009 | Barkol et al. | |
| 2009/0224777 A1 | 9/2009 | Kim et al. | |

OTHER PUBLICATIONS

Cordelia Schmid, Roger Mohr and Christian Bauckhage, "Evaluation of Interest Point Detectors," International Journal of Computer Vision, Jun. 2000, pp. 151-172, vol. 37, Issue 2, Kluwer Academic Publishers, The Netherlands.

Pierre Moreels and Pietro Perona, "Evaluation of Features Detectors and Descriptors based on 3D Objects," International Journal of Computer Vision, 2006, pp. 263-284, vol. 73, Issue 3, Springer Science + Business Media, USA.

E De Castro and C Morandi, "Registration of Translated and Rotated Images Using Finite Fourier Transforms," IEEE Transactions on Pattern Analysis and Machine Intelligence, Sep. 1987, pp. 700-703, vol. 9, Issue 5, IEEE Computer Society, Washington, DC, USA.

Christopher J.C. Burges, "A Tutorial on Support Vector Machines for Pattern Recognition," Data Mining and Knowledge Discovery 2, 1998, pp. 121-167.

(Continued)

*Primary Examiner* — Anh Hong Do
(74) *Attorney, Agent, or Firm* — Kristine Elizabeth Matthews; David C. Ripma (57) ABSTRACT

Aspects of the present invention are related to systems, methods and apparatus for image-based automatic defect detection.

24 Claims, 8 Drawing Sheets

OTHER PUBLICATIONS

Yoav Freund and Robert E. Schapire, "Experiments with a New Boosting Algorithm," in Proceedings of the Thirteenth International Conference on Machine Learning (ICML '96), Jul. 1996, pp. 148-156, Bari, Italy.

Steve Marschner, "2D Geometric Transformations," located at http://www.cs.cornell.edu/Courses/cs465/2006fa/lectures/07transforms2d.ppt.pdf, Fall 2006, Cornell CS 465 Fall 2006, Lecture 7, Cornell.

* cited by examiner

METHODS, SYSTEMS AND APPARATUS FOR DEFECT DETECTION

FIELD OF THE INVENTION

Embodiments of the present invention relate, in general, to defect detection. More specifically, embodiments of the present invention relate to image-based automatic detection of a defective area in an industrial product.

BACKGROUND

One conventional approach to defect detection is by human inspection. In such approaches, a human operator may need to examine each image of an industrial product to identify a defective area, or areas, and to manually label the defects. This human process may depend heavily on the skills and expertise of the operator. Additionally, the time required to process different images may be significantly different, which may cause a problem for a mass-production pipeline. Furthermore, the working performance may vary considerably between human operators and may drop quickly over time due to operator fatigue.

Other conventional approaches to defect detection may comprise image template matching, for example, phase correlation in the image frequency domain and normalized cross correlation in the spatial image domain. However, these methods may be sensitive to image noise, contrast change and other common imaging degradations and inconsistencies. Perhaps more importantly, these methods cannot handle the situation when a model image is geometrically transformed due to camera motion and different operating settings.

Robust and automatic methods, systems and apparatus that can perform defect detection on different images in substantially the same amount of time and at substantially the same level of accuracy may be desirable. Additionally, a method, system and apparatus that can learn from previous input and improve its performance automatically may also be desirable.

SUMMARY

Embodiments of the present invention relate, in general, to defect detection. More specifically, embodiments of the present invention relate to image-based automatic detection of a defective area in an industrial product.

According to a first aspect of some embodiments of the present invention, an offline training stage may be executed prior to an online classification stage.

According to a second aspect of some embodiments of the present invention, both the online stage and the offline stage comprise robust image matching in which a geometric transform between an input image and a corresponding model image may be estimated. The estimated geometric transform may be used to transform the input image and the corresponding model image to a common coordinate system, thereby registering the input image and the corresponding model image. Image difference measures may be computed from the registered input image and the registered corresponding model image.

According to a third aspect of some embodiments of the present invention, the robust image matching may comprise an iterative process in which feature-point matches between feature points in the input image and feature points in the corresponding model image may be updated guided by a current estimate of the geometric transform. The geometric transform estimate may, in turn, be updated based on the updated feature-point matches.

According to a fourth aspect of some embodiments of the present invention, pixel-based difference measures may be computed from the registered input image and the registered corresponding model image.

According to a fifth aspect of some embodiments of the present invention, window-based difference measures may be computed from the registered input image and the registered corresponding model image.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Embodiments of the present invention relate, in general, to defect detection. More specifically, embodiments of the present invention relate to image-based automatic detection of a defective area in an industrial product, for example, an electronic circuit, a Liquid Crystal Display (LCD) panel and other industrial products.

According to some embodiments of the present invention, a digital image of an industrial product may be acquired from one, or more, digital cameras in order to assess whether or not the industrial product comprises a defective area, and, if so, to identify the defective area and classify the defects.

Figure 1:
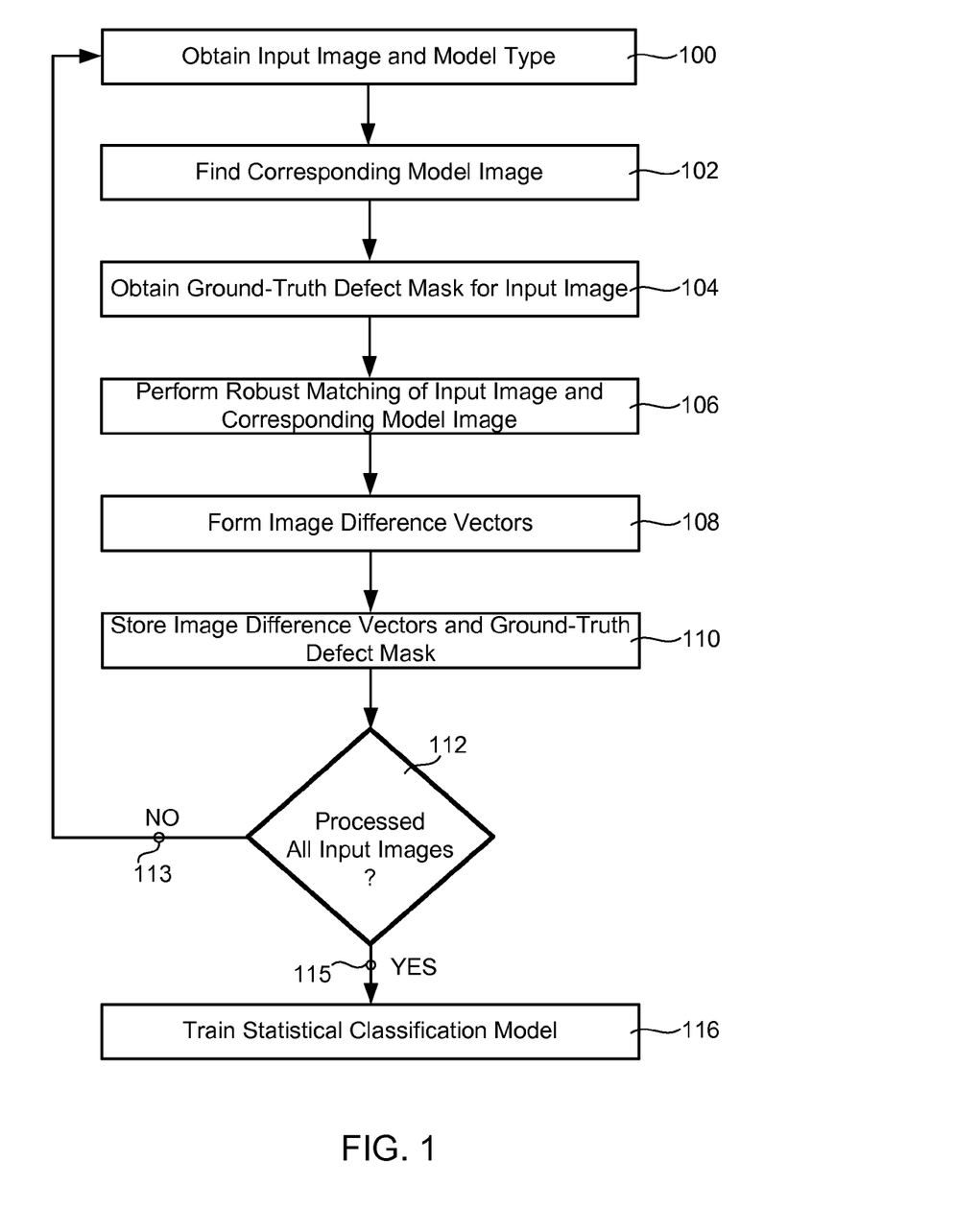
FIG. 1 is a chart showing exemplary embodiments of the present invention comprising offline training of a statistical classification model.

Some embodiments of the present invention may comprise an offline training stage described in relation to FIG. 1. In these embodiments, a model-image database may be created and updated by one, or more, human operators. The model-image database may contain different model images and associated information for each model image. Exemplary associated information may be model type, an element label image and other model-image information. Whenever a new model image is added to the model-image database, an operator may enter the information associated with the newly entered model image. The database may be implemented according to any of the known-in-the-art database implementations, for example, by conventional relational database software, for example, SQLite and other conventional relational database software, indexed by the model type. In the offline training stage, an input image and model-type information for the input image may be obtained 100. The corresponding model image maybe found 102 in the model-image database, and a ground-truth defect mask for the input image may be obtained 104. The ground-truth defect mask for the input image may be obtained 104 by querying a human operator to provide, for each pixel, a label identifying each pixel in the input image as a defect or a non-defect. In some embodiments of the present invention, a label of "1" may indicate a defect and a label of "−1" may indicate a non-defect. Other label values may be used in alternative embodiments. A robust matching may be performed 106 between the input image and the corresponding model image, and a set of image difference vectors may be formed 108 for all image pixels. The image difference vectors and the ground-truth defect mask may be stored 110 for the input image. A determination 112 may be made as to whether or not all input images have been processed. If all input images have not been processed 113, then the next input image and model-type information for the next input image may be obtained 100 and the processing of the newly obtained input image may proceed. If all input images have been processed 115, then the stored image difference vectors and associated ground-truth defect masks for all of the input images may be used to train 116 a statistical classification model to be used in online defect detection according to embodiments of the present invention.

Performing 106 robust matching of the input image and the corresponding model image may comprise estimation of a 2-dimensional (2D) geometric transform, also referred to as an inter-image transform or a transform, between the input image and the corresponding model image. The 2D geometric transform may be a one-to-one transform that may warp a first pixel in one of the images to a new position in the other image. After the 2D geometric transform is estimated, the input image and the corresponding model image may be warped to a common 2D coordinate system. In some embodiments, the corresponding model image may be warped to the coordinate system of the input image. In alternative embodiments, the input image may be warped to the coordinate system of the corresponding model image. In still alternative embodiments, the input image and the corresponding model image may be both warped to a new coordinate system.

Figure 2:
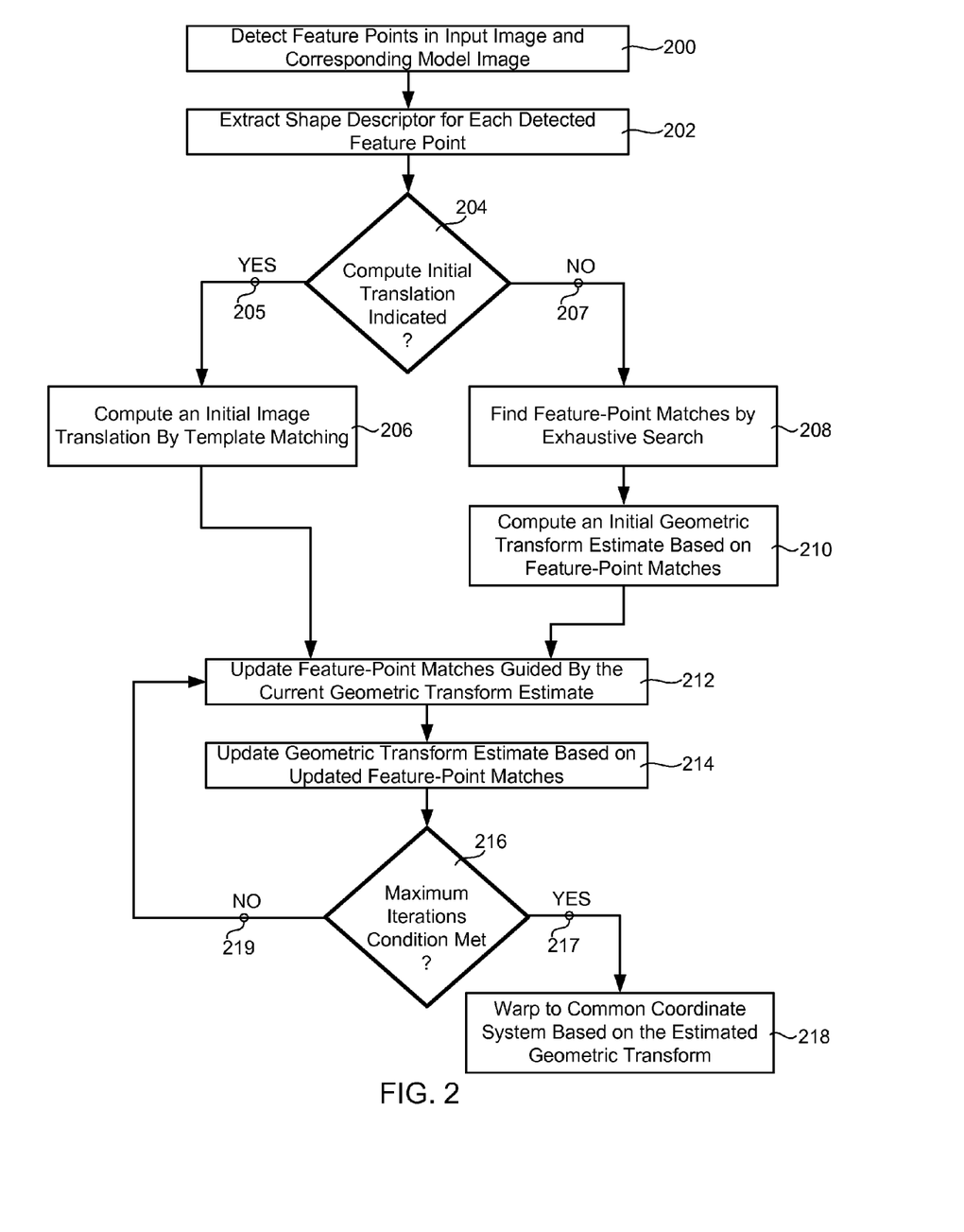
FIG. 2 is a chart showing exemplary embodiments of the present invention comprising robust matching of an input image and a corresponding model image.

Estimation of the inter-image transform, also referred to as image registration, according to embodiments of the present invention may be understood in relation to FIG. 2. In these embodiments, a transform, which may be denoted $T_{12}$, may map a first point, which may be denoted $p_1(x_1, y_1, 1)$, in a first image, for example, the input image or the corresponding model image, to a first point, which may be denoted $p_2(x_2, y_2, 1)$, in a second image, for example, the corresponding model image or the input image, according to:

$$\begin{bmatrix} x_2 \\ y_2 \\ 1 \end{bmatrix} = T_{12} \begin{bmatrix} x_1 \\ y_1 \\ 1 \end{bmatrix},$$

where $T_{12}$ may be represented by a 3×3 matrix associated with a 2D translation, a rotation, a scaling, an affine transformation, a homography and other inter-image transforms. According to embodiments of the present invention, a number of feature points may be detected 200 in the input image and the corresponding model image. A shape descriptor may be extracted 202 for each detected feature point. A person having ordinary skill in the art will recognize that there are, known in the art, many methods and systems for the detection 200 of the feature points and the extraction 202 of a shape descriptor for each feature point. Exemplary methods may be found in "Evaluation of Interest Point Detectors," *International Journal of Computer Vision*, 37(2):151-172, June 2000, by C. Schmid, R. Mohr and C. Bauckhage and in "Evaluation of Features Detectors and Descriptors based on 3D Objects," *International Journal of Computer Vision*, 73(3):263-284, July 2007, by P. Moreels and P. Perona, both articles of which are hereby incorporated by reference herein in their entirety.

In some embodiments of the present invention described in relation to FIG. 2, an operator may indicate 204 whether or not to initialize the geometric transform estimate to a 2D translation. The operator indication may be referred to as a translation indicator. If the translation indicator indicates to compute 205 an initial translation, then an initial image translation may be computed 206 according to template matching methods known in the art, for example, phase correlation and other template matching methods. In some embodiments of the present invention, the initial image translation may be estimated using the entire model image and the entire input image. In alternative embodiments, the template matching may use a selected region-of-interest (ROI) in the model image and the input image. In some embodiments, the ROI may be a rectangular-shaped, or other-shaped, region containing distinctive features in the model image to facilitate the template matching. The geometric transform estimate may be initialized to the initial image translation. If the translation indicator indicates not to compute 207 an initial translation, then an initial geometric transform estimate may be computed from matched feature points. Feature-point matches may be found 208 by an exhaustive search between the detected feature points in the input image and the detected feature points in the corresponding model image.

Figure 3:
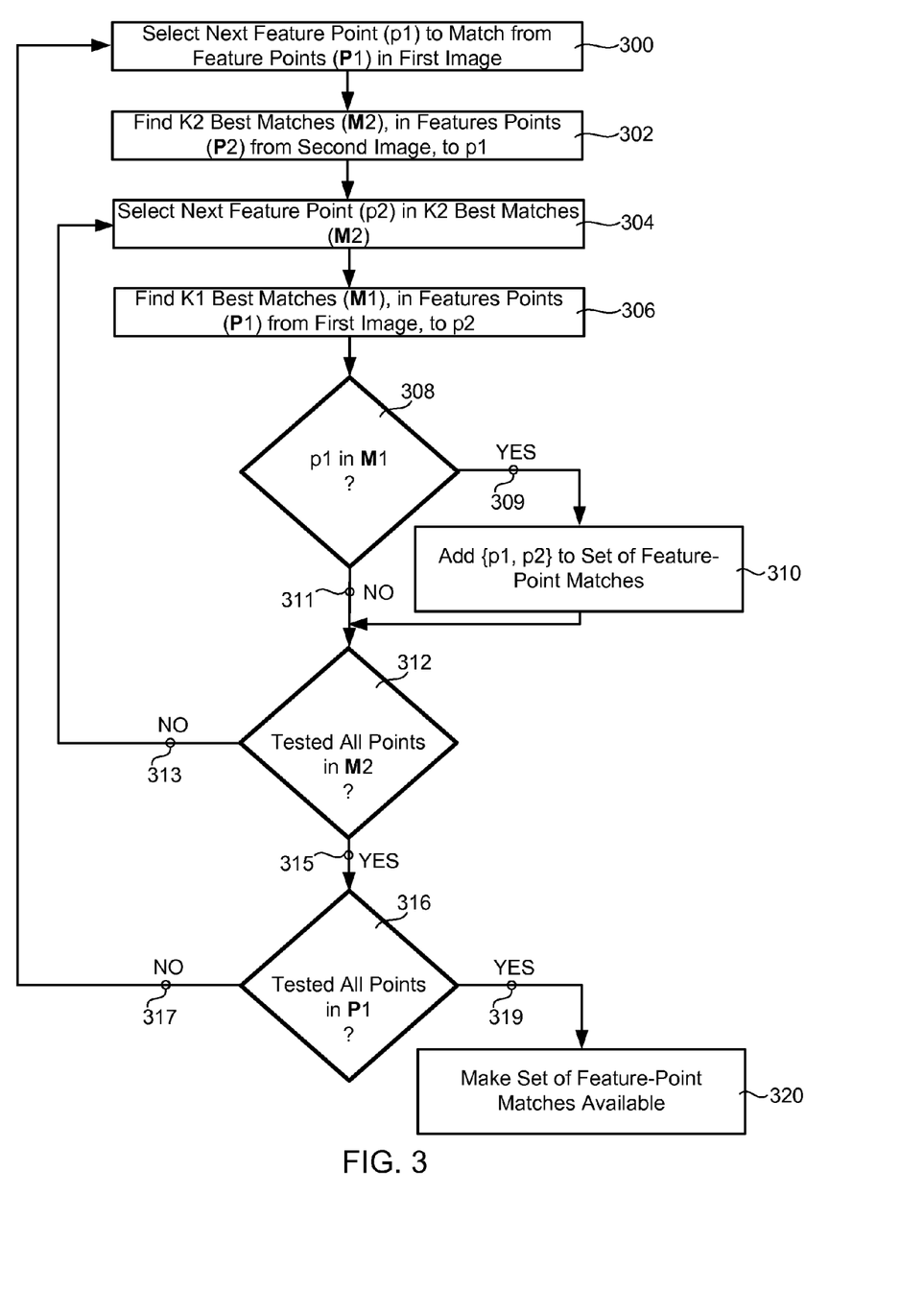
FIG. 3 is a chart showing exemplary embodiments of the present invention comprising feature-point matching.

In some embodiments of the present invention described in relation to FIG. 2 and FIG. 3, feature-point matches may be found 208 by selecting 300 an unprocessed feature point associated with a first image, either the input image or the corresponding model image, from the feature points associated with the first image. The unprocessed feature point may be referred to as the next feature point to match and may be denoted p1. The feature points associated with the first image may be denoted P1. The K2 best matches, from the feature points associated with a second image, the other of the input image or the corresponding model image, to p1 may be determined 302. These K2 best matches, from the feature points associated with the second image, may be denoted M2, and the feature points associated with the second image may be denoted P2. An unprocessed feature point, which may be denoted p2, from M2 may be selected 304, and the K1 best matches, from the feature points associated with the first image, to p2 may be determined 306. The K1 best matches M1 may be examined 308 to determine if p1 is in the set. If p1 is in M1 309, then the feature point pair {p1, p2} may be added 310 to a set of feature-point matches and then the remaining points in M2 may be tested 312. If p1 is not in M1 311, then remaining points in M2 may be tested 312. If there are remaining points in M2 to be tested 313, then the next feature point in the K2 best matches M2 may be selected 304. If there are no remaining points in M2 to be tested 315, then a determination 316 may be made as to whether or not all points in P1 have been tested. If there are remaining points in P1 to be tested 317, then the next feature point in P1 may be selected 300, and the matching process may continue. If there are no remaining points in P1 to be tested 319, then the set of feature-point matches may be made available 320 to subsequent processes and for subsequent processing, for example, computing an initial transform based on the feature-point matches 210. In some embodiments of the present invention, K1 and K2 may have the same value.

Figure 4:
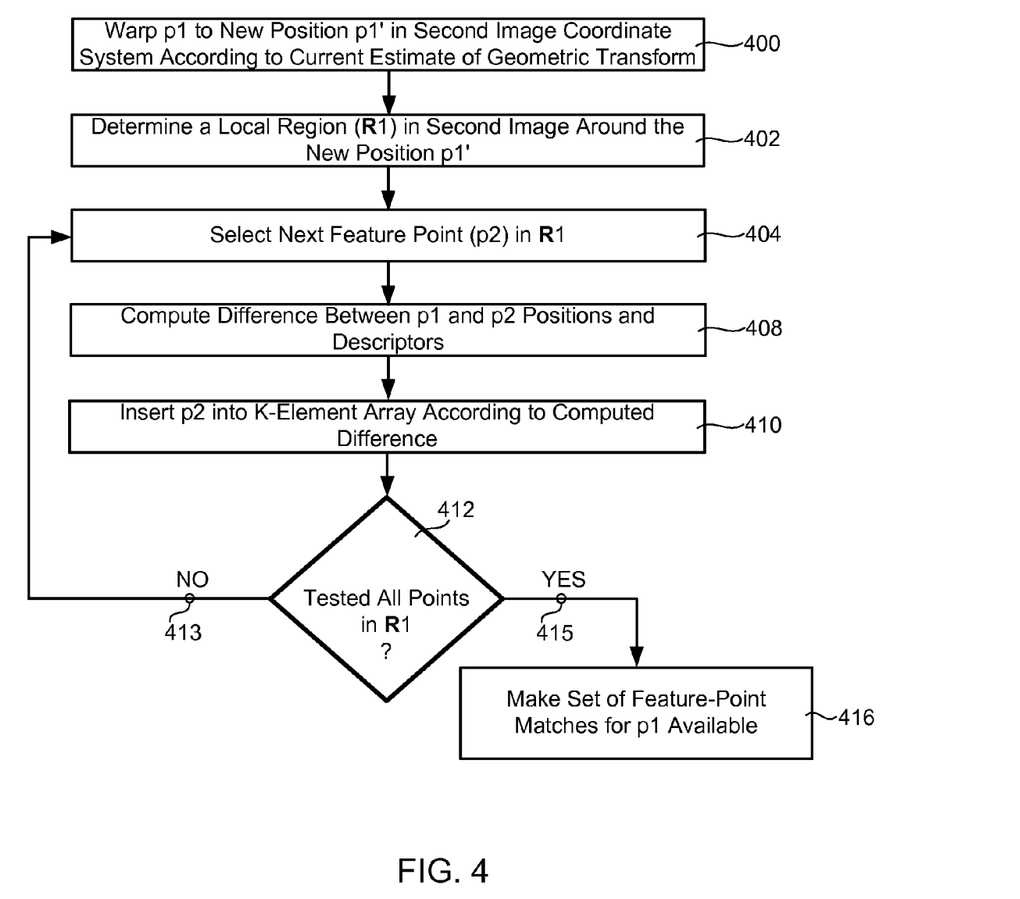
FIG. 4 is a chart showing exemplary embodiments of the present invention comprising updating feature-point matches guided by a current geometric transform estimate.

After an initial geometric transform estimate has been determined 206, 210, then the feature-point matches may be updated 212 as guided by the current geometric transform estimate, initially the initial geometric transform. The current-geometric-transform-estimate guided feature-point matches update 212 may be understood in relation to FIG. 4 for a first point p1 in the first image. Initially, p1 may be warped 400 to a new position p1' in the second image coordinate system according to the current estimate of the geometric transform. A local region, which may be denoted R1, may be determined 402 in the second image around the new position p1'. A next un-tested feature point, which may be denoted p2, from the feature points in the local region R1 may be selected 404, and the difference between p1 and p2 positions and descriptor values may be computed 408, and if p2 is in the top K matches with p1, then p2 may be inserted 410 into a K-element array according to the computed 408 difference. A determination 412 may be made as to whether or not all feature points in R1 have been tested. If there are remaining feature points to be tested 413, then the next un-tested feature point may be selected 404 and tested. If all feature points in R1 have been tested 415, then the set of feature-point matches for p1 may be made 416 available for subsequent processing and to subsequent processes. The geometric transform estimate may be updated 214 based on the updated, also considered current, feature-point matches. The number of feature-point matches guided by the current geometric transform estimate updates and a maximum number of allowed iterations may be compared 216, and if a condition between the two values is met 217, then the input image and the corresponding model image may be warped 218 to a common coordinate system based on the estimated geometric transform, thereby producing a registered input image and a registered model image. If the condition between the two values is not met 219, than the update process may be iterated again.

Referring again to FIG. 1, image difference vectors may be formed 108 at each pixel location in the registered images. In some embodiments of the present invention described in relation to FIG. 5, formation of the image difference vectors may comprise generating 500 a comparison mask image. The comparison mask image may be generated 500 by computing the pixel value difference between the pixel values in the registered input image and the registered model image at each pixel location. In some embodiments, the absolute difference values may be compared to a threshold value. If the absolute difference value is less than the threshold value, then the mask value may be set to zero, and if the absolute difference value is not less than the threshold value, then the mask value may be set to a non-zero value. In some embodiments, the mask value may be set to zero only when the absolute difference value is equal to zero.

Figure 5:
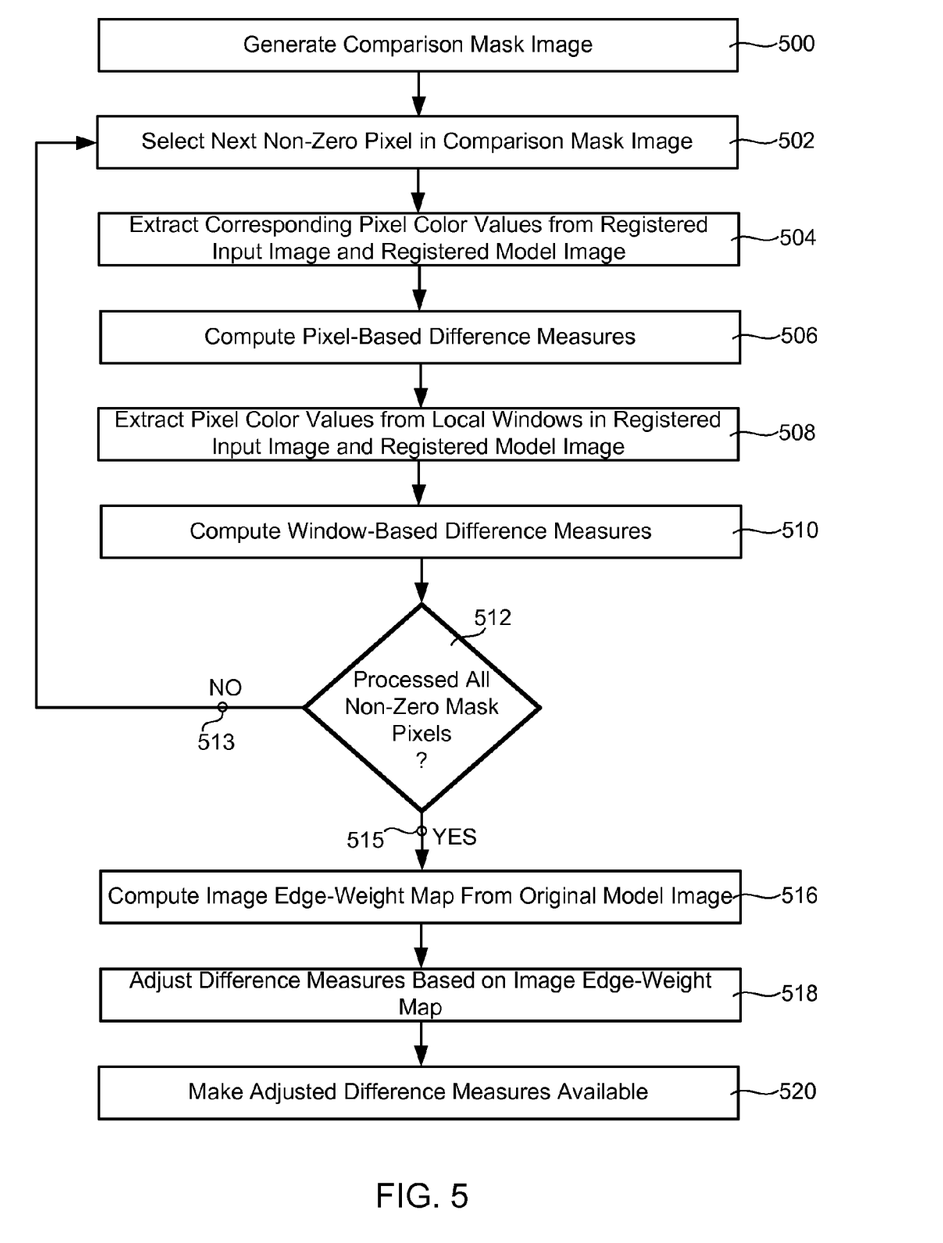
FIG. 5 is a chart showing exemplary embodiments of the present invention comprising computation of image differences.

The next unprocessed non-zero pixel in the comparison mask image may be selected 502, and corresponding pixel color values from the registered input image and the registered model image may be extracted 504. Pixel-based difference measures maybe computed 506 from the color pixel values. In some embodiments of the present invention, a direct absolute difference value may be calculated according to:

$$\text{diff}_{abs}(x,y) = |I(x,y) - M(x,y)|,$$

where $I(x, y)$ and $M(x, y)$ may denote the color values at pixel location $(x, y)$ in the registered input image and the registered model image, respectively. In some embodiments of the present invention, a direct relative difference value may be calculated according to:

$$\text{diff}_{rel}(x, y) = \left| \frac{I(x, y) - M(x, y)}{M(x, y)} \right|.$$

In some embodiments, a linear 1-dimensional (1D) transform between the registered input image intensity values and the registered model image intensity values may be determined according to:

$$\min_{(a,b)} \sum_{(x,y)} |I(x, y) - aM(x, y) - b|,$$

where a and b are the transform parameters. In some embodiments of the present invention, a compensated direct absolute difference value and a compensated direct relative difference value may be calculated according to:

$$\text{compdiff}_{abs}(x, y) = |I(x, y) - aM(x, y) - b|$$

and $$\text{compdiff}_{rel}(x, y) = \left| \frac{I(x, y) - aM(x, y) - b}{aM(x, y) + b} \right|,$$

respectively.

Pixel color values may be extracted 508 from a local region around the selected pixel location, and windowed difference measures may be computed 510. In some embodiments, a squared difference value may be calculated according to:

$$\text{sqdiff}(x, y) = \sum_{(x,y) \in W} |I(x, y) - M(x, y)|,$$

where W denotes the local region. In some embodiments, a normalized cross correlation value may be calculated according to:

$$crosscorr(x, y) = \frac{\sum_{(x,y) \in W} (I(x, y) - \overline{WI})(M(x, y) - \overline{WM})}{\sum_{(x,y) \in W} |I(x, y) - \overline{WI}| \sum_{(x,y) \in W} |(M(x, y) - \overline{WM})|},$$

where $\overline{WI}$ and $\overline{MI}$ denote the mean values of the registered input image intensity values within the local region W and of the registered model image intensity values with the local region W, respectively.

A determination 512 may be made as to whether or not all non-zero mask pixels have been processed. If not 513, then the next non-zero mask pixel may be selected 502 and processed. If so 515, then an image edge-weight map may be computed 516 from the model image. The image edge-weight map may determine pixel weighting values based on the distance of a pixel from an edge in the model image. Pixel locations closer to an edge may have a smaller weighting value than pixel locations further from an edge. In some embodiments, the weighting values may be in the range of zero to one with pixel locations coincident with an edge location being given a weighting value of zero and those furthest from an edge being given a weighting value of one. The difference measures may be adjusted 518 according to the image edge-weight map, and the adjusted difference measures may be made available 520 to subsequent processes and for subsequent processing. In some embodiments, the distance measures may be adjusted by multiplying the unadjusted distance measure values by the corresponding weight value.

Figure 6:
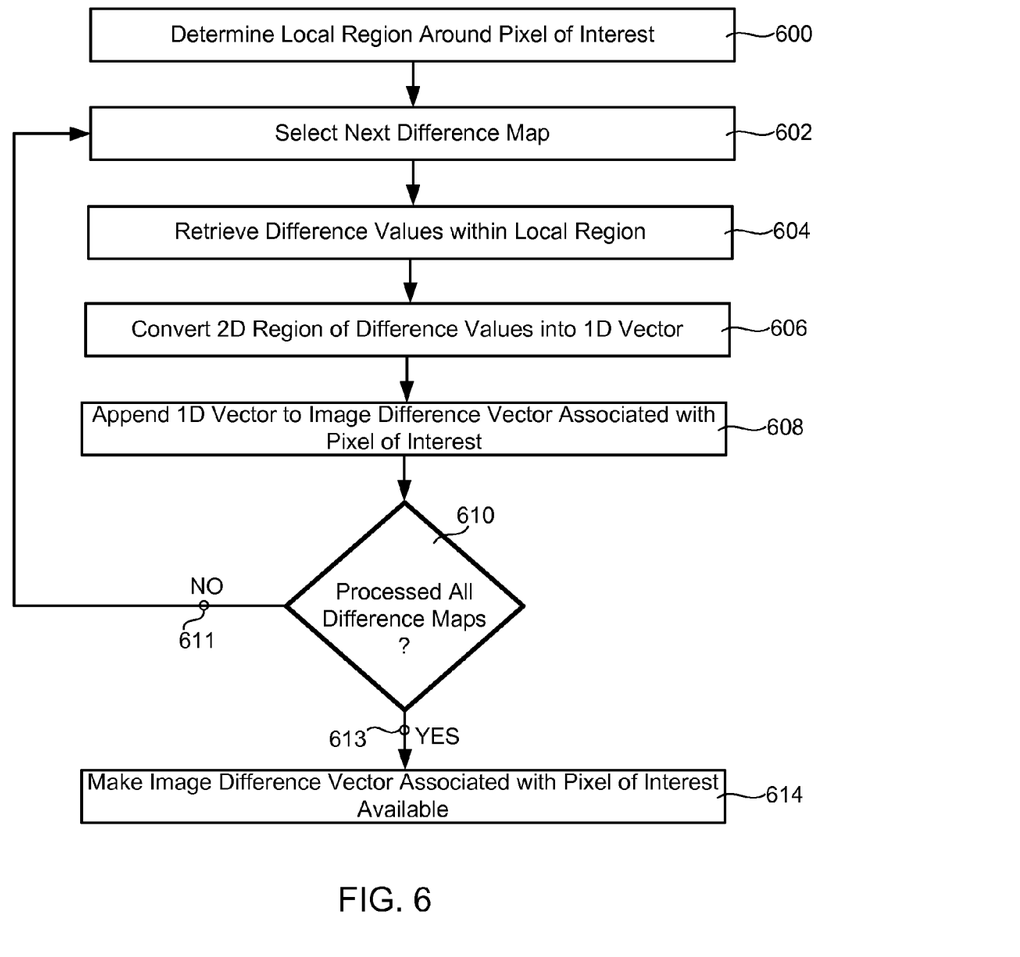
FIG. 6 is a chart showing exemplary embodiments of the present invention comprising formation of an image difference vector.

An image difference vector may be formed at each pixel location as described in relation to FIG. 6. A local region around the pixel location may be determined 600. In some embodiments, the local region may be a rectangular region centered on the pixel location. An unprocessed difference map may be selected 602, and the difference values associated with the difference map may be retrieved 604 for the pixel locations within the local region. The 2D array of difference values may be converted 606 into a 1D vector of difference values. The 1D vector of values associated with the currently processed difference map may be appended to an image difference vector associated with the pixel location. A determination 610 may be made as to whether or not all difference maps have been processed. If not 611, then the next unprocessed difference map may be selected 602. If so 613, then the image difference vector associated with the pixel location may be made available 614 to subsequent processes and for subsequent processing.

Referring to FIG. 1, after all input images have been processed 115, for each input image, an image difference vector for each pixel location in the input image and a ground-truth defect mask have been stored. The statistical classification model may be trained 116 using the stored image difference vectors and ground-truth defect mask for each input image. The training process may be described in relation to FIG. 7.

Figure 7:
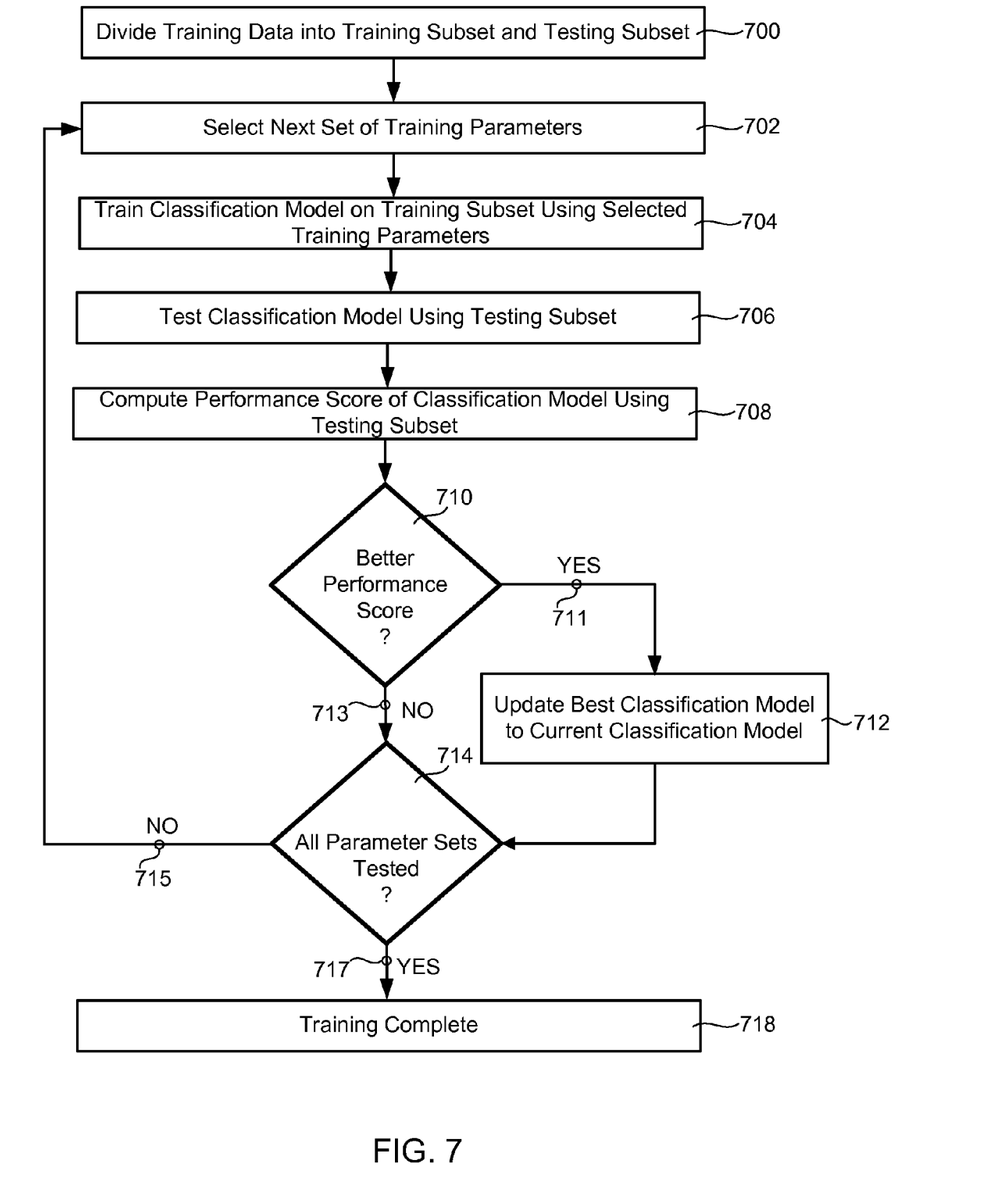
FIG. 7 is a chart showing exemplary embodiments of the present invention comprising training of a statistical classification model.

The statistical classification model takes as input image difference vectors associated with an input image and generates an output label for each pixel location in the input image. The labeled output may be referred to as a labeled classification map indicating the classification of each pixel, for example, "defect" and "non-defect." Exemplary embodiments for the statistical classification model may include a support vector machine, a boosted classifier and other classification models known in the art.

The training data may be divided 700 into two subsets: a training subset and a testing subset. An untested set of training parameters maybe selected 702 from a set of possible training parameters. The statistical classification model may be trained 704 on the training subset using the selected training parameters. The trained statistical classification model may be tested 706 using the testing subset. The testing may comprise input of the image difference vectors associated with an input image in the testing subset to the statistical classification model which may generate a labeled output wherein each pixel location in the input image is labeled as a "defect" or a "non-defect." After all input images in the testing subset are processed, a performance score may be computed 708 for the currently trained classification model using the ground-truth defect masks. In some embodiments of the present invention, the performance score associated with a classification model may be defined based on the true positive rate and the false positive rate according to:

$$\text{Score} = TP + \alpha(1 - FP),$$

where TP and FP are the true positive rate and the false positive rate, respectively, and α is design parameter associated with the performance requirements of the defect detection system. In these embodiments, a higher score may be indicative of better classification model performance.

The performance score of the currently tested classification model may be compared 710 to the performance score of the current best classification model. If the performance score of the currently tested classification model is better 711 than the performance score of the current best classification model, the current best classification model may be updated 712 to the currently tested classification model, and a determination 714 may be made as to whether or not there remain parameter sets to be tested. If the performance score of the currently tested classification model is not better 713 than the performance score of the current best classification model, then a determination 714 may be made as to whether or not there remain parameter sets to be tested. If there are 715 parameter sets remaining to be tested, the next untested parameter set may be selected 702. If there are no 717 parameter sets remaining to be tested, the training may be completed 718, and the current best classification model may be used in an online defect detection process.

Figure 8:
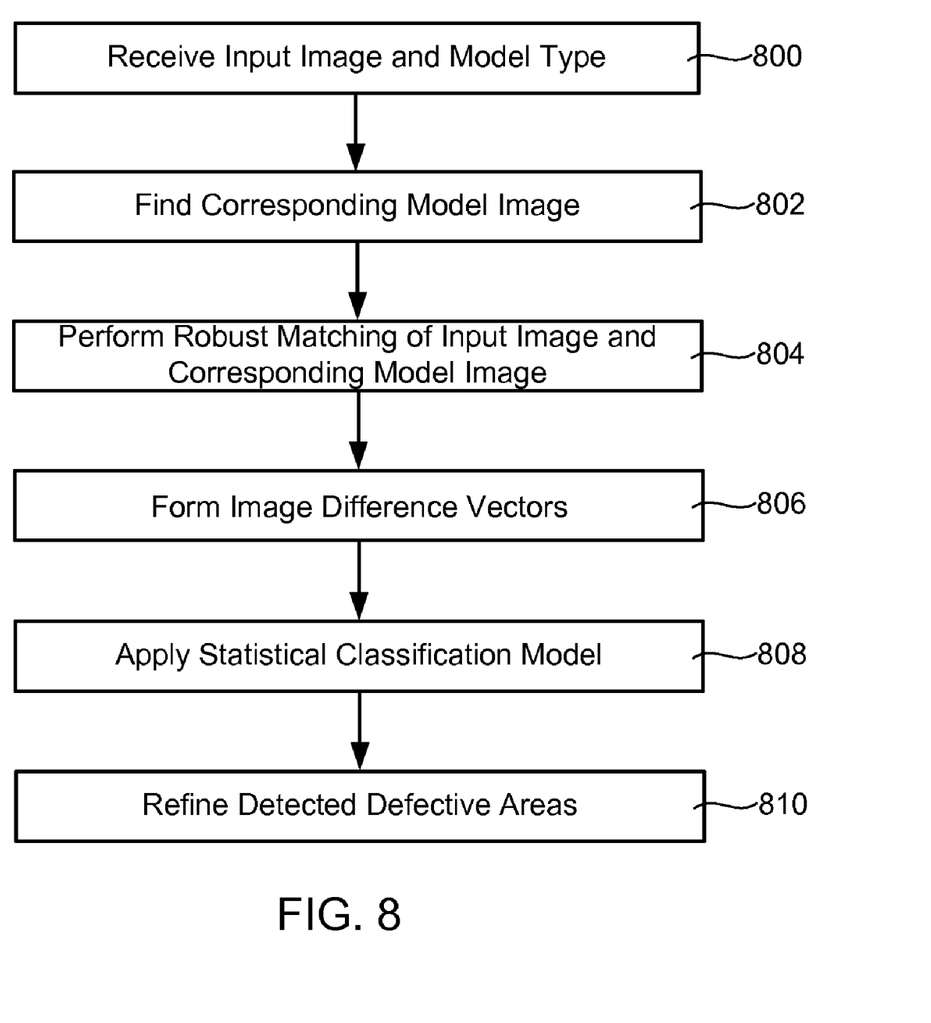
FIG. 8 is a chart showing exemplary embodiments of the present invention comprising online defect detection.

Some online defect detection embodiments of the present invention may be understood in relation to FIG. 8. An input image and model-type information for the input image may be received 800. A corresponding model image maybe found 802 in a model-image database. The model-image database may be implemented according to any of the known-in-the-art database implementations, for example, by conventional relational database software, for example, SQLite and other conventional relational database software, indexed by the model type. A robust matching may be performed 804 between the input image and the corresponding model image, and a set of image difference vectors may be formed 806 for all image pixels. The robust matching and the image difference vector formation may be performed as previously described in relation to the offline training stage. The image difference vectors may be applied as input to the previously trained statistical classification model 808, and the detected defective areas returned by the statistical classification model may be refined 810 by one, or more post-processing steps. Exemplary post-processing steps may include morphological dilation, color region growing, connected-component analysis and other post-processing region refinement steps known in the art.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for detecting a defect in an industrial part, said method comprising:
   a) receiving an input image associated with an industrial part;
   b) receiving a model type associated with said input image;
   c) obtaining a model image corresponding to said model type;
   d) estimating an inter-image transform between said model image and said input image, wherein said estimating comprises:
      i) detecting a first set of feature points in said input image;
      ii) detecting a second set of feature points in said model image;
      iii) determining a current geometric transform estimate;
      iv) iteratively updating, until a maximum iteration condition is satisfied:
         (1) a set of feature-point matches between said first set of feature points and said second set of feature points based on said current geometric transform estimate; and
         (2) said current geometric transform estimate based on said set of updated feature-point matches; and
      v) assigning said iteratively updated current geometric transform estimate to said estimated inter-image transform;
   e) obtaining a registered input image and a registered model image by transforming said model image and said input image to a common coordinate system based on said estimated inter-image transform;
   f) forming a plurality of image difference vectors associated with said input image and said model image; and
   g) applying a statistical classification model to said plurality of image difference vectors, wherein said statistical classification model generates a labeled classification map associated with said input image.

2. A method as described in claim 1 further comprising post-processing said labeled classification map associated with said input image.

3. A method as described in claim 1, wherein said industrial part is a part selected from the group consisting of a liquid crystal display panel and an electronic circuit.

4. A method as described in claim 1, wherein said estimating an inter-image transform further comprises:
   a) extracting a first shape descriptor for each feature point in said first set of feature points, thereby producing a first set of shape descriptors, and for each feature point in said second set of feature points, thereby producing a second set of shape descriptors; and
   b) determining said set of feature-point matches between said first set of feature points and said second set of feature points using said first said of shape descriptors and said second set of shape descriptors.

5. A method as described in claim 1 further comprising:
   a) receiving a translation indicator;
   b) determining an initial image translation between said input image and said model image when said translation indicator indicates to compute an initial translation; and
   c) when said translation indicator does not indicate to compute an initial translation:
      i) finding a first set of feature-point matches between said first set of feature points and said second set of feature points; and
      ii) computing an initial geometric transform estimate based on said first set of feature-point matches.

6. A method as described in claim 5, wherein said determining an initial image translation comprises matching a region-of-interest in said model image to said input image.

7. A method as described in claim 6, wherein said region-of-interest in said model image contains at least one distinctive model-image feature.

8. A method as described in claim 1, wherein said common coordinate system is the coordinate system associated with said input image.

9. A method as described in claim 1, wherein said common coordinate system is the coordinate system associated with said model image.

10. A method as described in claim 1, wherein said updating a set of feature-point matches between said first set of feature points and said second set of feature points comprises:
   a) warping a first point to a new position in a new coordinate system according to said estimated inter-image transform;
   b) determining a local region proximate to said new position; and
   c) testing all points in said local region to determine a feature-match point for said first point.

11. A method as described in claim 1, wherein said forming a plurality of image difference vectors associated with said input image and said model image further comprises:
   a) computing at least one pixel-based difference measure; and
   b) computing at least one window-based difference measure.

12. A method as described in claim 1 further comprising:
   a) computing an image edge-weight map for said model image; and
   b) adjusting said plurality of image difference vectors using said image edge-weight map.

13. A method as described in claim 12, wherein said image edge-weight map more heavily weights a first pixel than a second pixel when said first pixel is located closer to an edge than said second pixel.

14. An apparatus for detecting a defect in an industrial part, said apparatus comprising:
 a) an image receiver for receiving an input image associated with an industrial part;
 b) a model-type receiver for receiving a model type associated with said input image;
 c) a model-image retriever for obtaining a model image corresponding to said model type;
 d) an inter-image-transform estimator for estimating an inter-image transform between said model image and said input image, wherein said estimating comprises:
  i) detecting a first set of feature points in said input image;
  ii) detecting a second set of feature points in said model image;
  iii) determining a current geometric transform estimate;
  iv) iteratively updating, until a maximum iteration condition is satisfied:
   (1) a set of feature-point matches between said first set of feature points and said second set of feature points based on said current geometric transform estimate; and
   (2) said current geometric transform estimate based on said set of updated feature-point matches; and
  v) assigning said iteratively updated current geometric transform estimate to said estimated inter-image transform;
 e) an image transformer for obtaining a registered input image and a registered model image by transforming said model image and said input image to a common coordinate system based on said estimated inter-image transform;
 f) a difference calculator for forming a plurality of image difference vectors associated with said input image and said model image; and
 g) a statistical classification model for generates a labeled classification map associated with said input image based on said plurality of image difference vectors.

15. An apparatus as described in claim 14 further comprising a post processor for post-processing said labeled classification map associated with said input image.

16. An apparatus as described in claim 14, wherein said industrial part is a part selected from the group consisting of a liquid crystal display panel and an electronic circuit.

17. An apparatus as described in claim 14, wherein said estimating an inter-image transform further comprises:
 a) extracting a first shape descriptor for each feature point in said first set of feature points, thereby producing a first set of shape descriptors, and for each feature point in said second set of feature points, thereby producing a second set of shape descriptors; and
 b) determining said set of feature-point matches between said first set of feature points and said second set of feature points using said first said of shape descriptors and said second set of shape descriptors.

18. An apparatus as described in claim 14 further comprising:
 a) a translation-indicator receiver for receiving a translation indicator;
 b) a translation estimator for determining an initial image translation between said input image and said model image when said translation indicator indicates to compute an initial translation; and
 c) when said translation indicator does not indicate to compute an initial translation:
  i) a feature-point matcher for finding a first set of feature-point matches between said first set of feature points and said second set of feature points; and
  ii) an initial-geometric-transform calculator for computing an initial geometric transform estimate based on said first set of feature-point matches.

19. An apparatus as described in claim 14, wherein said common coordinate system is the coordinate system associated with said input image.

20. An apparatus as described in claim 14, wherein said common coordinate system is the coordinate system associated with said model image.

21. An apparatus as described in claim 14, wherein said updating a set of feature-point matches between said first set of feature points and said second set of feature points comprises:
 a) warping a first point to a new position in a new coordinate system according to said estimated inter-image transform;
 b) determining a local region proximate to said new position; and
 c) testing all points in said local region to determine a feature-match point for said first point.

22. An apparatus as described in claim 14, wherein said difference calculator further comprises:
 a) a pixel-based difference calculator for computing at least one pixel-based difference measure; and
 b) a window-based difference calculator for computing at least one window-based difference measure.

23. An apparatus as described in claim 14 further comprising:
 a) an edge-weight map calculator for computing an image edge-weight map for said model image; and
 b) an adjustor for adjusting said plurality of image difference vectors using said image edge-weight map.

24. A method for training a defect detection system for detecting a defect in an industrial part, said method comprising:
 a) receiving an input image associated with an industrial part;
 b) receiving a model type associated with said input image;
 c) obtaining a model image corresponding to said model type;
 d) receiving a ground-truth defect mask associated with said input image;
 e) estimating an inter-image transform between said model image and said input image, wherein said estimating comprises:
  i) detecting a first set of feature points in said input image;
  ii) detecting a second set of feature points in said model image;
  iii) determining a current geometric transform estimate;
  iv) iteratively updating, until a maximum iteration condition is satisfied:
   (1) a set of feature-point matches between said first set of feature points and said second set of feature points based on said current geometric transform estimate; and
   (2) said current geometric transform estimate based on said set of updated feature-point matches; and
  v) assigning said iteratively updated current geometric transform estimate to said estimated inter-image transform;

f) obtaining a registered input image and a registered model image by transforming said model image and said input image to a common coordinate system based on said estimated inter-image transform;
g) forming a plurality of image difference vectors associated with said input image and said model image; and
h) training a statistical classification model using said plurality of image difference vectors and said ground-truth defect mask.

* * * * *